United States Patent [19]

Dexheimer

[11] Patent Number: 4,699,727
[45] Date of Patent: Oct. 13, 1987

[54] HEAT TRANSFER FLUIDS HAVING IMPROVED THERMAL STABILITY

[75] Inventor: Edward M. Dexheimer, Grosse Ile, Mich.

[73] Assignee: BASF Corporation, Wyandotte, Mich.

[21] Appl. No.: 800,698

[22] Filed: Nov. 22, 1985

[51] Int. Cl.$^4$ ............................................... C09K 5/00
[52] U.S. Cl. ............................................ 252/77; 252/73; 252/78.1; 252/79; 252/574; 252/578; 568/53; 568/609; 568/635; 165/1
[58] Field of Search .................... 252/73, 77, 78.1, 79, 252/574, 578; 568/53, 609, 635

[56] References Cited

U.S. PATENT DOCUMENTS

| 2,786,080 | 3/1957 | Patton, Jr. | 252/78.1 |
| 3,544,637 | 12/1970 | Kober et al. | 568/609 |
| 3,803,246 | 4/1974 | Rosenzweig et al. | 568/609 |
| 4,350,602 | 9/1982 | Schiller | 252/78.1 |
| 4,360,144 | 11/1982 | Cuddy et al. | 427/312 |
| 4,460,486 | 7/1984 | Newkirk | 568/609 |

FOREIGN PATENT DOCUMENTS 2378 1/1983 Japan ................................ 252/78.1

Primary Examiner—Robert A. Wax
Attorney, Agent, or Firm—William G. Conger

[57] ABSTRACT

Thermally stable heat transfer fluids are disclosed which are polyoxyethylene polymers initiated with bisphenols. These polymers do not smoke excessively, volatilize, nor form sludge in high temperature heat transfer operations in open and closed systems.

18 Claims, 1 Drawing Figure

EFFECT OF 0.5% BY WEIGHT
PHENOTHIAZINE ON SMOKE POINTS
OF POLYETHERS

HEAT TRANSFER FLUIDS HAVING IMPROVED THERMAL STABILITY

BACKGROUND OF THE INVENTION

1. Field of the Invention

The present invention relates to heat transfer fluids, sometimes designated "functional fluids." More particularly, the invention relates to heat transfer fluids which have exceptionally high thermal stability.

2. Description of the Relevant Art

In the decade of the 1970's, the energy crisis sensitized industry to the need to conserve our energy resources to a degree never seen previously. The result of this movement toward energy conservation has not slackened despite the more ready availability of energy. Today, most industrial processes are designed to conserve or reuse raw materials and to minimize heat loss. For this purpose, a wide variety of heat transfer fluids are available.

For low temperature heat, the fluorochlorohydrocarbons serve as efficient means of heat transfer. For moderate temperatures, aqueous systems, generally containing suitable corrosion inhibitors are in general use, while at moderately elevated temperatures various glycols such as ethylene glycol, propylene glycol and their low molecular weight oligomers such as diethylene glycol have proven useful and cost effective. For higher temperature applications, however, especially those above 350° F. (176° C.), few satisfactory heat transfer fluids are available, and those that are available suffer from serious drawbacks.

Polyhalogenated hydrocarbons such as polychlorinated and polybrominated biphenyls and biphenyloxides have been utilized as high temperature heat transfer fluids. These fluids are particularly useful where resistance to flammability is important. However, these fluids are expensive, at least potentially carcinogenic, and especially deleterious to the environment. They cannot be utilized in open systems due to the possibility of inhalation. Moreover, these compounds, because of their high halogen content, may cause corrosion problems with certain metals such as the non-stainless steels, copper, lead, and tin at the elevated temperatures at which they are used. Furthermore, in many applications water solubility is essential and these types of fluid are virtually insoluble in water.

Low molecular weight oligomeric polyoxyalkylene glycols are water soluble and can be utilized to some extent in higher temperature applications in closed systems, but tend over long periods of time to resinify and deposit large quantities of tar or sludge. Furthermore, they cannot be utilized in open systems due to their tendency to volatilize and to smoke or fume.

High molecular weight polyoxyalkylene glycols have been proposed as high temperature heat transfer fluids due to their lower volatility and greater thermal stability, for example, in U.S. Pat. No. 3,054,174. Polymers of this class, such as the high molecular weight polyoxyethylene glycols, have achieved some success commercially. However, they are still much too volatile for many high temperature uses such as reflow of low temperature alloys. Furthermore, they tend to fume excessively, and, although water soluble themselves, tend to deposit a varnish type residue which is difficult, if not impossible, to remove by standard techniques such as water washing. An additional drawback is that the more stable, higher molecular weight products are solids at room temperature and thus present handling problems which render them totally unacceptable in some industries.

Polyoxyethylene-polyoxypropylene block copolymers derived from bisphenol A have been proposed for limited use in a high temperature application in U.S. Pat. No. 4,360,144. These bisphenol A initiated copolymers are suggested for use in wave soldering machines where their function is to lower the solder surface tension and minimize surface oxidation of the molten solder. The thermal stability of these prior art polyethers decreased as the polyoxyethylene content increased. However, even in this special application, these polyethylene-polyoxypropylene copolymers have not been able to displace the more economical nonylphenol oxyethylates. Both the nonylphenoloxyethylates and the products of U.S. Pat. No. 4,360,144 have the further drawback of producing sludge during their use, especially when used in bulk. Furthermore, their low water solubility and high viscosity make it difficult to remove them completely from substrates by commercial rinsing techniques.

SUMMARY OF THE INVENTION

The present invention relates to the preparation of heat transfer fluids which do not volatilize or fume appreciably at high temperatures, are easily removed by rinsing, and which do not tend to deposit sludge nor resinify to varnish-like substances. A further object of the present invention relates to the preparation and use of heat transfer fluids which are liquid at ordinary temperatures, which place little or no stress on the environment, and which may be utilized in either open or closed systems.

These and other objects were unexpectedly met by the discovery that low molecular weight polyoxyalkylene glycols initiated with bisphenols and deriving substantially all the polyoxyalkylene moiety from ethylene oxide have superior thermal stability despite their low molecular weight. These polyoxyalkylene glycols may be used advantageously in both closed and open systems where heat transfer by means of a fluid is desirable or necessary. They are used advantageously in metal quenching and tempering baths and in solder reflow or alloying baths as disclosed in U.S. Pat. Nos. 2,740,193, 3,054,174, 3,214,827, 3,690,943, and 2,671,264. Other applications involving high temperatures which require fluids of exceptional thermal stability may suggest themselves.

DESCRIPTION OF THE PREFERRED EMBODIMENTS

Figure 1:
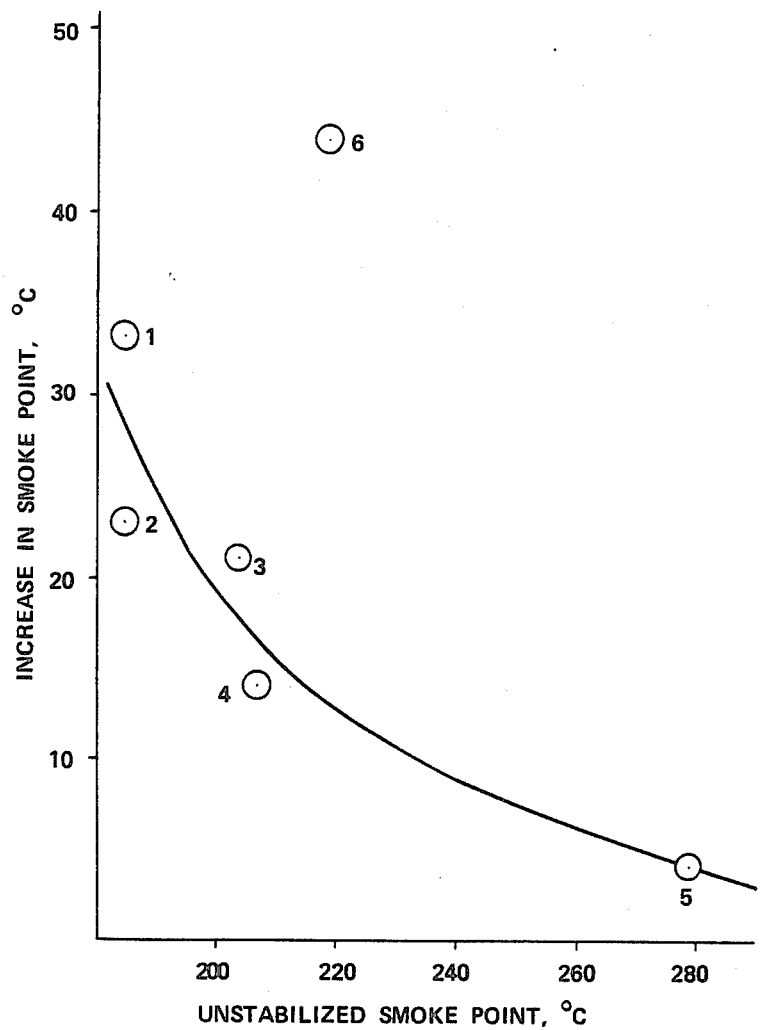

The polyoxyalkylene polymers of use in the subject invention are prepared by oxyalkylating, in the presence of suitable catalysts, an initiator of the bisphenol family. Oxyalkylation is accomplished by utilizing ethylene oxide, or ethylene oxide and a very minor amount of a higher $C_3$–$C_4$ alkylene oxide such as propylene oxide or butylene oxide. If a higher alkylene oxide is added, it may be present in the polyoxyalkylene chain as a cap, but should not be present as an internal block or as a random copolymer chain segment. No more than five moles of higher alkylene oxide per mole of initiator should be added and, in any event, the amount of higher alkylene oxide should not exceed 10 percent of the total polymer weight. Preferably, the polyoxyalkylene moieties are derived exclusively from ethylene oxide.

The heat transfer fluids of the subject invention have molecular weights of from 600 to 1200 Daltons, preferably from 800 to 1100 Daltons, and most preferably, from 800 to 1000 Daltons. A molecular weight of approximately 900 Daltons is especially preferred.

The heat transfer fluids of the subject invention are prepared by methods well known to those skilled in the art. Methods of preparation, for example, are disclosed in U.S. Pat. No. 3,803,246. Generally, the initiator and catalyst are charged to a medium to high pressure autoclave, and alkylene oxide charged at a pressure of less than 6 bar, and a temperature of from 70° C. to 170° C. over a time period sufficient to provide a product of the desired molecular weight. For each mole of initiator, from 9 to 23 moles of ethylene oxide is required depending upon the molecular weight.

Preferably, potassium hydroxide is utilized as the oxyalkylation catalyst, generally in amounts from 0.01 percent to 5 percent by weight relative to the total charge. While Lewis acids may also be utilized as catalysts, alkaline catalysts are preferred. Following oxide addition, the contents of the autoclave are maintained at the oxyalkylation temperature for a short period to allow the last of the alkylene oxide to react. The autoclave is then vented, cooled, and discharged.

The catalyst may be left in the product, but preferably it is neutralized, removed by adsorption, or neutralized followed by removal of the resulting salts. If the neutralization is accomplished by means of the addition of an organic carboxylic acid, the salts of neutralization may be left in the product. When the catalyst is neutralized with an inorganic acid, the salts are preferably removed by filtration. In the case where catalyst removal without prior acid neutralization is desired, magnesium silicate may be added followed by subsequent filtration. Water washing to remove the catalyst cannot be practiced, since the heat transfer fluids are generally water soluble. Preferably, the catalyst is neutralized with acetic acid.

If propylene oxide or butylene oxide is also utilized in the oxyalkylation, it is added in sufficient quantity to replace the ethylene oxide on approximately a mole-per-mole basis so as not to increase the molecular weight unduly. No more than five moles of higher alkylene oxide per mole of initiator should be added. Preferably, if such higher alkylene oxide is added, it is added after all the ethylene oxide is added or toward the end of the ethylene oxide addition. The presence of oxypropyl groups near the initiator or as an internal block, or as a random copolymer chain segment, results in undesirable decreases in the thermal stability of the polymer.

The polyoxyalkylene polyethers of the subject invention may also be capped with aralkyl groups such as the benzyl group or with alkyl groups, preferably lower alkyl groups having from 1 to 8 carbon atoms. The capping of hydroxyl functional polyethers is well known to those skilled in the art and is generally practiced with active alkylating agents. For example, when methyl terminated polyethers are desired, suitable methyl group introducing reagents are methyl chloride and dimethyl sulfate.

To completely methyl cap one mole of a difunctional polyol, two moles of sodium hydride is slowly added to one mole of the polyol. Two moles of methyl chloride is then added slowly at reflux. The product mixture is treated with water and magnesium silicate, filtered and stripped of volatiles. The hydroxyl number of the methyl capped product is typically below 5 and often below 2.

Suitable initiators have formulas corresponding to:

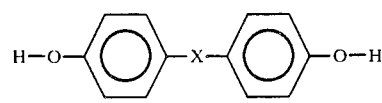

wherein X is a radical selected from the group consisting of

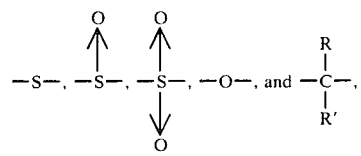

wherein R and R' are individually selected from the group consisting of hydrogen and $C_1$ to $C_4$ lower alkyl.

Examples of suitable bisphenol initiators include 4,4'-bis(hydroxyphenyl)sulfide, 4,4'-bis(hydroxyphenyl)sulfone, 4,4'-bis(hydroxylphenyl)oxide, and preferably, the bis(4-hydroxylphenyl) substituted methanes. Examples of the latter are 2,2-bis(4-hydroxyphenyl)propane, 2,2-bis(4-hydroxyphenyl)butane and 3,3-bis(4-hydroxyphenyl)pentane. Most preferable is 2,2-bis(4-hydroxyphenyl)propane (bisphenol A).

The thermally stable heat transfer fluids of the subject invention may be formulated with a wide variety of additives to enable performance of specific functions while maintaining their excellent thermal stability. In closed systems exposed to metal surfaces, for example, a variety of corrosion inhibitors including both those operating in the liquid phase and vapor phase, i.e., morpholine, may be added. Various organic amines, carboxylic acids, and carboxylic acid amides may be used for such functions. These various corrosion inhibitors are well known to those skilled in the art.

Antioxidants such as hindered phenols and the like may also be added if appreciable amounts of entrained air are expected to be contained within the system. In open systems, the presence of antioxidants is especially desirable. Examples of suitable antioxidants are the polymeric hindered phenols such as IRGANOX® 1010, available from Ciba-Geigy Corporation, Greensboro, N.C. Also suitable are stabilizers produced via reaction in the presence of a Friedel-Crafts type catalyst of dicyclopentadiene and p-cresol followed by further reaction with isobutylene. The preparation of such inhibitors is described in U.S. Pat. No. 3,751,375, for example. One such stabilizer is available from the Goodyear Tire and Rubber Company, Akron, Ohio, under the trade name WINGSTAY® L. Conventional stabilizers such as butylated hydroxyanisole (BHA) and butylated hydroxytoluene (BHT) may also be utilized. Another even more preferred antioxidant is phenothiazine. Antioxidants are preferably present in amounts of from 0.05 percent to 5 percent by weight, preferably from 0.1 to 1.5 percent by weight, and most preferably from 0.5 to 1.5 percent by weight.

The stabilization of the subject invention heat transfer fluids with phenothiazine has provided an unexpected effect, as illustrated in FIG. 1. Normally, phenothiazine increases the smoke point of such fluids by an amount which is inversely proportional to the smoke point of the unstabilized heat transfer fluid. This is illustrated in the graph where the increase in smoke point as a result of stabilization with 0.5 percent phenothiazine decreases rapidly as the unstabilized smoke point increases.

In FIG. 1, polyethers 1–5 are comparative polyether heat tranfer fluids. Polyether 1 is a butanol initiated 50:50 EO/PO heteric polyether; polyethers 2 and 3 are bisphenol A initiated heteric polyethers having EO/PO ratios of 80:20 and 15:85, respectively; polyether 4 is a commercial heat transfer fluid which is a nonylphenol oxyethylate; and polyether 5 is a hydroquinone oxyethylate. As indicated, the effectiveness of phenothiazine decreases as the unstabilized smoke point increases. However, when 0.5 percent phenothiazine is added to heat transfer fluid "A" (polyether 6) of the subject invention, the already high smoke point is raised by an exceptionally large amount. This interaction between phenothiazine and the subject heat transfer fluids is completely unexpected.

Other additives may be added as the situation demands. For example, if the heat transfer fluids are to be utilized in solder reflow baths or as a combination heat transfer and oxidation prevention layer in stationary solder pots, it may be advisable to add from 1 percent to 10 percent by weight of a $C_9C_{22}$ long chain carboxylic acid, for example, oleic acid. In those applications where the prevention of foam is essential, defoamers may be added. Suitable defoamers are the well known silicone oils and high polyoxypropylene content polyoxyalkylene surfactants. Examples of the latter are PLURONIC® L61 and L62 polyoxyalkylene polyethers.

The thermally stable heat transfer fluids of the present invention may also be used in conjunction with other polyoxyalkylene fluids, or with other functional fluids such as neopentyl glycol diesters. However, the amounts of such other fluids must generally be minimized in order to maintain the superior thermal stability of the heat transfer fluids of the subject invention. When nonylphenol oxyethylates are used, for example, generally less than 20 percent, preferably less than 10 percent of such nonylphenol oxyethylates should be used.

The following examples of heat transfer fluids within the scope of the invention and comparative fluids may be used to illustrate the advantages of the subject invention. In Table I below, the effect of increasing the molecular weight of polyoxyethylene glycols is illustrated by a series of pan tests. As can be seen, the thermal stability increases with increased molecular weight. The pan tests were performed by placing 3.00 grams of each polyoxyethylene glycol into a tared aluminum pan and placing these pans in a circulating air oven maintained at 210° C. The pans were weighed at intervals and the weight remaining expressed as a percentage of the original weight.

TABLE I

| Polyoxyethylene Glycol Molecular Weight | % Residue Remaining After | | |
|---|---|---|---|
| | 1 hour | 2 hours | 4.5 hours |
| 200 | 6 | 4 | 3 |
| 400 | 31 | 8 | 6 |
| 600 | 42 | 13 | 8 |
| 1000 | 50 | 15 | 9* |
| 1450 | 62 | 25 | 9* |
| 2000 | 68 | 31 | 9* |

*Heavy, varnish-like residue

This same trend of increased stability with increasing molecular weight is shown by comparing the behavior of a 1500 Dalton molecular weight nonylphenol oxyethylate with a similar oxyethylate having a molecular weight of 660 Daltons. The 1500 Dalton product had approximately twice the stability of the 660 Dalton product as measured by 24-hour pan tests at 240° C. and reported in Table III. Thus it is surprising that the stability of bisphenol A oxyethylates decreases rather than increases as the molecular weight rises above approximately 1200 Daltons.

In Table II, two prior art high temperature bisphenol A initiated polyether polyols are compared with the all polyoxyethylene bisphenol A initiated polyols of the subject invention having comparable molecular weight. In the prior art products, as the amount of ethylene oxide in the product increased, the thermal stability decreased. Therefore, it was completely unexpected that an all polyoxyethylene bisphenol A initiated heat transfer fluid would exhibit greater thermal stability.

TABLE II

| Bisphenol A-Initiated Polyether Type | Mol. Wt. | Smoke point °C. | 20 hr. Pan Test, 240° C. Residue wt. % |
|---|---|---|---|
| 15/85 EO/PO[1] | 1100 | 204 | 54 |
| 80/20 EO/PO | 1100 | 185 | 30 |
| 100% EO[2] | 900 | 219 | 59 |

[1]EO = ethylene oxide, PO = propylene oxide
[2]Polyether A of the subject invention In Table III following the preparative examples, the polyoxyethylene polyether heat transfer fluids of the subject invention are compared with other representative polyethers having similar molecular weights, including several which are commercially utilized as heat transfer fluids. The pan tests were conducted at 240° C. for 24 hours, unless otherwise noted, using 3.00 gram samples. Beaker tests were conducted at 232° C. in a circulating air oven, utilizing 40.0 gram samples contained in 250 ml glass beakers. The residue is expressed as percent of weight retained relative to the initial weight over time periods of up to 181 hours.

PREPARATIVE EXAMPLE

Heat transfer fluid A was prepared by charging a prepared five-gallon stainless steel autoclave with 11,711 grams of bisphenol A and 19 g of 90 percent potassium hydroxide. The autoclave was sealed, purged, and pressure checked following which heat was applied in order to raise the temperature to 160° C. without agitation. When a substantial portion of the bisphenol A was melted, as indicated by the free rotation of the agitator shaft, agitation was begun. The charge was agitated at 160° C. for one hour, following which the autoclave was pressurized with dry nitrogen to 2.3 bar, and 4,289 g ethylene oxide added at a pressure less than 6.1 bar. Following the ethylene oxide addition, the reaction mixture was allowed to react to constant pressure. The product was discharged to a nitrogen flushed container.

The bisphenol A-ethylene oxide adduct prepared in the previous paragraph in an amount of 5547 grams was added to a similarly prepared five gallon autoclave with 13.8 g of 45 percent aqueous KOH. After stripping off volatiles at reduced pressure, the contents were heated with agitation to 145° C. The pressure was adjusted to 2.3 bar with nitrogen following which 10,453 grams of ethylene oxide was added at less than 6.1 bar. Following oxide addition, the mixture was allowed to react to constant pressure, cooled to 115° C., and 12.94 g glacial acetic acid added to neutralize the catalyst.

Heat transfer fluid B was prepared by adding phenothiazine in an amount of 0.5 percent by weight relative to the fluid weight to heat transfer fluid A. The oxyethylated bisphenol A polyether heat transfer fluids have molecular weights of approximately 900 Daltons.

by weight relative to the weight of polyoxyalkylene polyether.

7. The process of claim 3 wherein phenothiazine is present to the extent of approximately 0.5 percent by weight relative to the weight of polyoxyalkylene polyether.

8. A heat transfer fluid comprising (a) a cogeneric

TABLE III

| Heat Transfer Fluid | Molecular Weight | 24 hour Pan Tests % Residue | Beaker Tests, % Residues at time: | | | | | Sludge | Smoke Point °C. |
|---|---|---|---|---|---|---|---|---|---|
| | | | 3 hrs. | 20 hrs. | 67 hrs. | 86 hrs. | 181 hrs. | | |
| Polyoxyethylene glycol | 600 | 8 (4.5 hr, 210° C.) | — | — | — | — | — | varnish | 173 |
| Polyoxyethylene glycol | 1000 | 9 (4.5 hr, 210° C.) | — | — | — | — | — | varnish | 176 |
| Oxyethylated octylphenol[1] | 650 | — | 90 | 33 | 13 | — | 8 | heavy | — |
| Oxyethylated octylphenol[1,2] | 650 | 3 | 97 | 82 | 61 | — | 23 | heavy | 207 |
| Oxyethylated nonylphenol[2] | 660 | 3 | 95 | 77 | 55 | 53 | 30 | heavy | 207 |
| Oxyethylated nonylphenol[1,2,3] | 660 | 5 | — | — | — | — | — | heavy | 221 |
| Oxyethylated nonylphenol[2] | 1500 | 10 | — | — | — | — | — | heavy | 176 |
| Subject invention fluid A[2] | 900 | 59 | 99 | 95 | 93 | 90 | 79 | none | 219 |
| Subject invention fluid B[2,3] | 900 | 61 | — | — | — | — | 92 | none | 263 |

[1] Commercial heat transfer fluid
[2] Acetic acid neutralized
[3] Stabilized with 0.5 percent phenothiazine The embodiments of the invention in which an exclusive property or privilege is claimed are defined as follows:

1. A process for transferring heat by means of a heat transfer fluid comprising contacting an object with said fluid for a time sufficient to effect a transfer of heat between said object and said fluid, wherein said heat transfer fluid comprises (a) a cogeneric polyoxyalkylene polyether, prepared by the oxyalkylation of a suitable initiator molecule in the presence of an alkali metal hydroxide catalyst, and having a formula corresponding to

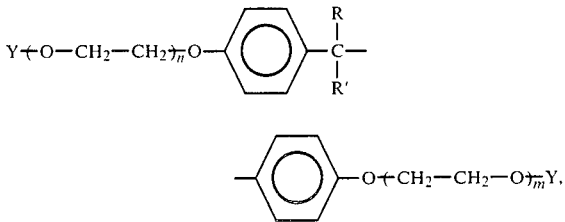

wherein R and R' are individually selected from the group consisting of hydrogen and $C_1$ to $C_4$ lower alkyl; wherein Y is a radical selected from the group consisting of hydrogen, $C_1$–$C_6$ lower alkyl and lower cycloalkyl and benzyl, and wherein n and m are such that the sum n+m affords a molecular weight of from 600 to 1200 Daltons; and (b) phenothiazine in an amount effective to raise the smoke point of said polyoxyalkylene polyether.

2. The process of claim 1 wherein said alkali metal hydroxide catalyst is neutralized with a $C_1$–$C_8$ organic carboxylic acid.

3. The process of claim 2 wherein said polyoxyalkylene polyether has a molecular weight of from 800 to 1000 Daltons.

4. The process of claim 3 wherein said organic carboxylic acid is acetic acid.

5. The process of claim 3 wherein phenothiazine is present in an amount of from 0.05 percent to 5.0 percent by weight relative to the weight of polyoxyalkylene polyether.

6. The process of claim 3 wherein phenothiazine is present in an amount of from 0.1 percent to 1.5 percent polyoxyalkylene polyether having a formula corresponding to

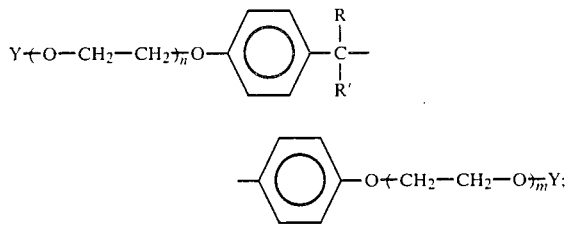

wherein R and R' are individually selected from the group consisting of hydrogen and $C_1$ to $C_4$ lower alkyl; wherein Y is a radical selected from the group consisting of hydrogen, or $C_1$–$C_6$ lower alkyl and lower cycloalkyl and benzyl, and wherein n+m are such that the sum n+m affords a molecular weight of from 600 to 1200 Daltons; and (b) phenothiazine in an amount effective to raise the smoke point of said polyoxyalkylene polyether.

9. The fluid of claim 8 wherein said polyoxyalkylene polyether has a molecular weight of from 800 to 1000 Daltons.

10. The fluid of claim 9 wherein said phenothiazine is present in an amount of about 0.5 percent by weight relative to the total fluid weight.

11. The fluid of claim 9 which also contains a defoamer.

12. The process of claim 1 wherein said heat transfer fluid is contained in a closed system.

13. The process of claim 1 wherein said heat transfer fluid is contained in an open system.

14. The process of claim 13 wherein said open system is selected from the group consisting of metal quenching baths, solder reflow baths, and open pot solder baths.

15. The process of claim 1 wherein said heat transfer fluid also contains a $C_9$–$C_{22}$ long chain carboxylic acid.

16. The process of claim 15 wherein said long chain carboxylic acid is oleic acid.

17. The fluid of claim 8 which also contains a $C_9$–$C_{22}$ long chain carboxylic acid.

18. The fluid of claim 17 wherein said long chain carboxylic acid is oleic acid.

* * * * *